US007974857B1

(12) United States Patent
Fischer et al.

(10) Patent No.: US 7,974,857 B1
(45) Date of Patent: Jul. 5, 2011

(54) UNEMPLOYMENT INSURANCE MANAGEMENT

(75) Inventors: Thomas M. Fischer, Centennial, CO (US); Jason A. Skurcenski, Aurora, CO (US)

(73) Assignee: Accenture Global Services Limited, Dublin (IE)

( * ) Notice: Subject to any disclaimer, the term of this patent is extended or adjusted under 35 U.S.C. 154(b) by 1794 days.

(21) Appl. No.: 10/733,251

(22) Filed: Dec. 12, 2003

Related U.S. Application Data

(60) Provisional application No. 60/432,845, filed on Dec. 12, 2002.

(51) Int. Cl.
*G06Q 40/00* (2006.01)
(52) U.S. Cl. .................. 705/4; 705/19; 705/31
(58) Field of Classification Search .......... 703/4; 705/4, 705/19, 31
See application file for complete search history.

(56) References Cited

U.S. PATENT DOCUMENTS

| | | | |
|---|---|---|---|
| 5,553,155 A * | 9/1996 | Kuhns et al. | 382/115 |
| 6,332,125 B1 * | 12/2001 | Callen et al. | 705/4 |
| 7,194,426 B1 * | 3/2007 | Box | 705/26 |
| 2002/0184148 A1 * | 12/2002 | Kahn et al. | 705/40 |
| 2003/0225639 A1 * | 12/2003 | Micciantuono | 705/30 |
| 2004/0186852 A1 * | 9/2004 | Rosen | 707/104.1 |
| 2005/0125259 A1 * | 6/2005 | Annappindi | 705/4 |
| 2005/0273371 A1 * | 12/2005 | Callen et al. | 705/4 |
| 2008/0015883 A1 * | 1/2008 | Hermann | 705/1 |

OTHER PUBLICATIONS

New Mexico opens its virtual employment office; [Business Outlook Edition] Diane Velasco Journal Staff Writer. Albuquerque Journal. Albuquerque, N.M.: Nov. 25, 2002. p. 9.*
Sending Your Government a Message: E-Mail Communication Between Citizens and Governmento C. Richard Neu, et al., RAND Publishing : 1999.*
South Carolina Tax Payments Go Online Knight Ridder Tribune Business News. Washington: Oct. 16, 2002. p. 1.*
Unemployment Compensation for Federal Employees National Finance Center, Office of the Chief Financial Officer U.S. Department of Agriculture : Aug. 1995.*
Montana Integrated System to Improve Customer Service (MISTICS) Legislative Audit Division State of Montana : Aug. 2002.*
Reporting of New Hires Saves Millions for State Dan Harrie The Salt Lake Tribune. Salt Lake City, Utah: Mar. 30, 1999. p. C.1.*
United States General Accounting Office "Unemployment Insurance Increased Focus on Program Integrity Could Reduce Billions in Overpayments", published Jul. 12, 2002.*
Stepan Jurajda, "Unemployment Outflow and Unemployment Insurance Taxes" CERGE-EI, published Apr. 22, 1999.*
New York State Department of Taxation and Finance, Employers Guide to Unemployment Insurance, Wage Reporting and Withholding Tax, Jul. 1999.*

* cited by examiner

*Primary Examiner* — Narayanswamy Subramanian
*Assistant Examiner* — Ryan D Donlon
(74) *Attorney, Agent, or Firm* — Fish & Richardson P.C.

(57) ABSTRACT

A system and method for handling unemployment insurance includes a unified database containing unemployment insurance benefit data and unemployment insurance tax data. The unemployment insurance benefit data and the unemployment insurance tax data are unified into unified data. In another aspect, the system and method include a unified desktop configured to allow a worker to manage the unemployment insurance benefit data and the unemployment insurance tax data. The unified desktop enables a worker to manage both claims for unemployment insurance benefits and unemployment insurance tax payments.

36 Claims, 35 Drawing Sheets

210 ⟶

UI Workers & Employers Resource Center Solution

Whether you're searching for a job, a few good employees, or a service that will facilitate work, your search is over.

Whatever your employment-related needs, let us work for you!

Related Links
Click here to connect to a wealth of useful sites.

Employers
- Find skilled, qualified workers
- Post jobs
- Register your business with the UI tax department
- File a Protest
- File an Appeal
- Submit your UI tax and benefit information online
- View UI policies and procedures
- Find child care providers for your employees
- Get job market facts From posting jobs and finding skilled, qualified employees to filing tax and benefit information online, workforce solutions are now at you fingertips, saving you time!

Workers
- Find a job
- Create a resume
- Find local child care providers
- Get job market facts
- Get Unemployment Insurance Whether you're interested in a new job or a new career, employment information and related services have never been so convenient!

Services
- Child care
- Training providers
- Transportation
- Other Services Click on these links for information about services that help make it easier to plan careers, get to work and attract employees.

Workers

| Account Profile | Claim History | File Claim | Policies and Procedures | Message Box |

Please answer the following questions

* 1. During the last 18 months, have you worked outside of the state?     ○Yes ○No

* 2. During the last 18 months have you worked for the federal government? This includes employment with NAF, AAFES, etc.     ○Yes ○No

* 3. During the last 18 months, have you performed any active military service of 90 days or more, other than training with a National Guard or reserve unit?     ○Yes ○No

* 4. In the last 12 months, have you filed a claim for benefits against any state other than Kansas?     ○Yes ○No Looking for a job? Check out Job Link.

Legend: * = required
Copyright © 2002     All rights reserved

* Highest Level of Education Completed [dropdown]
* Are you a Veteran?  ○ Yes  ○ No
  If yes, what is your Veteran Type [dropdown]
* Gender  ○ Male  ○ Female
* Date of Birth
  Enter as MM/DD/YYYY [field]

If you are known to your employer by another name, please enter it here:
  [field]

* We are required by the US Department of Justice to gather information regarding applicant's race and ethnic characteristics. This information is for statistical reporting only. Please check the box that applies to you.
  ○ White
  ○ Black
  ○ Asian
  ○ American Indian or Alaska Native
  ○ Native Hawaiian or Other Pacific Islander
  ○ Not listed above or I do not wish to supply this information

* Ethnic Heritage
  ○ Latino / Hispanic
  ○ Non Latino / Hispanic
  ○ None of the above

* Are you a citizen or National of the United States?  ○ Yes  ○ No
  If no, enter your Employment Authorization Number. [field]
  Your Employment Authorization Number is a 9 digit number that usually begins with, the letter A and can be found on one of the following documents issued to you by the Immigration and Naturalization Service: I-551, I-151, I-688, I-688A.

Enter your employment authorization expiration date
  Enter as MM/DD/YYYY [field]

* For security purposes, enter your Mother's Maiden Name. Enter last name only. [field]

For security purposes, enter your Driver's License or State ID Number, if you have one.
  Enter your number without spaces or dashes. [field]
  Select the state that issued the Driver's License or ID number.
  [dropdown]

Workers

Account Profile | Claim History | File Claim | Policies and Procedures | Message Box Residency Information

* Please select the country in which you live.
[dropdown]

* Please select the city in which you live. If your city is not listed, select "Other".
[dropdown]

Legend: * = required
Copyright © 2002    All rights reserved

| Account Profile | Claim History | File Claim | Policies and Procedures | Message Box |

Workers

You should be prepared to enter your work history for the last 18 months. If you worked for more than one employer during that time, we may request the company name, mailing address, dates worked and reason for separation from each employer. If you have filed a claim within the last 12 months, you may not be required to enter your complete work history at this time. Begin with your last or most recent employer. Employers for whom you worked part-tme or temporary jobs must be reported. If you are still working for an employer on a part-time basis, that employer must be listed. Please enter your last employer's name and the city in which this employer is located and select the search button.

Employer Search
You can search our system for your employer if you are unsure of their mailing address. Enter the employer name to begin the search. To improve the search capability, enter the city where your employer is located. When you find your employer's name, click on the "Add to Work History" link to add it to your employment history record.

\* Enter the company name: [          ]

Enter the city where your employer is located: [          ]

[  ] [  ]

Legend: * = required
Copyright © 2002   All rights reserved

|  | within 24 hours of when your last assignment ended, you must report your separation as Quit. |
|---|---|
| Fired | Your employer chose to end your employment when work is still available. |
| Leave of Absence | You are temporary off work, with the employer's knowledge, and you have a specific date to return to work. This does not include disciplinary actions. |
| Lack of Work | Work is not available because your employer has closed their business, permanently or temporarily; work is interrupted by bad weather; your work is seasonal or you are still working for your employer but your hours have been reduced by the employer. |
| Labor Dispute | You are a member of a labor union and are unemployed because of a contractual dispute with your employer. |

[Return To Top Of Page]

Legend: * = required
 Copyright © 2002          All rights reserved

| | | | |
|---|---|---|---|
| ★ | | | Workers |
| Account Profile | Claim History | File Claim | Policies and Procedures | Message Box |

Initial Claims Questions

| | | | |
|---|---|---|---|
| * | 1. | Are you a member of a placement union and get work only through the union hiring hall? | Yes ○  No ○ |
| | 1a. | Are you laid off from your last employer? | Yes ○  No ○ |
| | 1b. | If question 1a is answered Yes, select the reason for your layoff. | [▼] |
| * | 2. | Are you currently receiving Social Security, a company pension or other retirement benefits? | Yes ○  No ○ |
| * | 3. | Do you have transportation to work? | Yes ○  No ○ |
| * | 4. | Are you available to work 40 or more hours per week at this time? | Yes ○  No ○ |
| * | 5. | Are you available to accept work without any medical or other restrictions if work was offered today? | Yes ○  No ○ |
| * | 6. | Are you receiving Social Security disability payments due to a physical Impairment or handicap as defined in the Social Security Act of 1974? | Yes ○  No ○ |
| * | 7. | Do you have anyone in the home requiring care while you work? | Yes ○  No ○ |
| | 7a. | If yes, do you have a care provider for this person if you were offered work? (A care provider could be a friend, neighbor or relative.) | Yes ○  No ○ |
| * | 8. | Are you an officer of a corporation? | Yes ○  No ○ |
| * | 9. | Are you receiving or have you applied for Worker's Compensation? (Worker's Compensation is a payment issued as a result of a work related injury.) | Yes ○  No ○ |
| * | 10. | Are you currently enrolled or attending school or training? | Yes ○  No ○ |
| * | 11. | Are you self-employed? | Yes ○  No ○ |
| * | 12. | Have you refused work in the last 90 days? | Yes ○  No ○ |
| * | 13. | During the last 18 months, have you worked for a school district or an employer who contracts work to schools? (Some examples of contract services are bus transportation, school nurses, cafeteria workers and paraprofessionals) | Yes ○  No ○ |
| * | 13a. | If yes, do you have a reasonable assurance fo work in the same or similar capacity in the next school year or term? | Yes ○  No ○ |
| * | 14. | Are you currently on a substitute employee list for any school district? | Yes ○  No ○ |

If you are having difficulty completing this claim application and want to save your information and continue filling later, either through a regional call center or through the Internet, click on Save and File Later. If you have completed all of the required information and want to continue filing you claim on the internet, click on Continue Filing Claim.

Legend: * = required

🏠 Copyright © 2002          All rights reserved

☆ Employers

Registration

* Indicates Required Information
Have you been Previously Been Subject to Unemployment Compensation Law?

* ○ Yes ○ No

Did You Acquire This Business From Another Employer Or Is The Business That You Currently Own Being Reorganized?

* ○ Yes ○ No

Do You Employ One Or More Workers? (Corporate Officers and Limited Liability Company Members Providing Services for The Corporation Are Considered Employees.)

* ○ Yes ○ No

Unemployment Compensation Account Number:

☐☐☐ ☐☐ ☐☐

[Next]

Copyright © 2002    All rights reserved

[ ] - [ ] - [ ]
Address Line 1:                    Address Line 2:
[          ]                       [          ]
City:                              State    Zip
[          ]                       [KS ▼]   [     ]

2  First Name              MI      Last Name
   [          ]            [ ]     [          ]
   SSN:                            Title:
   [ ]-[ ]-[ ]                     [          ]
   Address Line 1:                 Address Line 2:
   [          ]                    [          ]
   City:                           State    Zip
   [          ]                    [KS ▼]   [     ]

3  First Name              MI      Last Name
   [          ]            [ ]     [          ]
   SSN:                            Title:
   [ ]-[ ]-[ ]                     [          ]
   Address Line 1:                 Address Line 2:
   [          ]                    [          ]
   City:                           State    Zip
   [          ]                    [KS ▼]   [     ]

4  First Name              MI      Last Name
   [          ]            [ ]     [          ]
   SSN:                            Title:
   [ ]-[ ]-[ ]                     [          ]
   Address Line 1:                 Address Line 2:
   [          ]                    [          ]
   City:                           State    Zip
   [          ]                    [KS ▼]   [     ]

Payroll Records Contact:
   *First Name             MI      *Last Name
   [          ]            [ ]     [          ]
   *Address Line 1:                Address Line 2:
   [          ]                    [          ]
   *City:                          *State   *Zip
   [          ]                    [KS ▼]   [     ]
   *Phone:
   ( [ ] ) [ ] - [ ] ext. [    ]
   Type of Employer:

\* O Yes O No

If no: List the Business Locations the Former Owner Still Operates (Trade Name, Address, Zip)

\*  [                                                                    ]

Did You Acquire 100% of the Former Owner's Business Assets?

\* O Yes O No

If no: List the Assets of the Former Owner's Business You Did Not Acquire (include accounts receivable)

[                                                                    ]

[Next]

Copyright © 2002    All rights reserved

Registration: Liability Determination

Did you employ any employees performing services for remuneration of kind in:

| Year 2002 | ●Yes ○No |
| Year 2001 | ○Yes ●No |
| Year 2000 | ●Yes ○No |
| Year 1999 | ●Yes ○No |
| Year 1998 | ○Yes ●No |

[Next]

Copyright © 2002    All rights reserved

☆ Employers

View Account Info  File Unemployment Transactions  Make Payment  Policies and Procedures  Message Box Seperation Information Request Claimant Information

| | |
|---|---|
| Sheila | Claim Date Filed: 08/12/2002 |
| SSN : | Benefit Year Beginning: 08/11/2002 |
| Reason For Separation: Lack of work | Benefit Year Ending: 08/10/2003 |
| Regarding: Initial Claim | Date Determination Mailed: 08/13/2002 |

The claimant Identified above has filed a claim for unemployment compensation benefits and listed you as a former employer. The information you furnish will be used to determine claimant's eligibility for unemployment compensation benefits.

Due Date Is 08/30/2002

* Indicates Required Information.
* Was the Claimants's Employment Covered by an unemployment Compensation Law?
   ○ Yes  ○ No
* What Date was the Claimant Hired?
   [         ] (mm/dd/yy)
* What was the Claimant's Last Day of Work?
   [         ] (mm/dd/yy)
* Since the Claimant's Hire Date, Did the Claimant Work Six or More Weeks Either Part-time or Full-time?
   ○ Yes  ○ No
   If No, Weeks Worked: [1▼]
* Did the Claimant Earn $xxx or More?
   ○ Yes  ○ No
   If No, Amount Earned: $ [         ]
* Was the Claimant Separated Due to Lack of Work?
   ○ Yes  ○ No
   If Yes, Is the Separation Less Than 45 Days?  ○ Yes  ○ No
      If Yes, Approximate Date of Recall: [         ]
      If No, Reason for Separation: [            ▼]
* Have Any Payments Been Made to the Claimant Since 12/24/2001?
   ○ Yes  ○ No Payments Made to Claimant Since Claimant's Hire Date:

| Payment Type | From Date | Through Date | Amount |
|---|---|---|---|

Employers

View Account Info  File Unemployment  Transactions  Make Payment  Policies and Procedures  Message Box

Request for Protest/Appeal

\* Indicates Required Information.

Claimant Information

| | |
|---|---|
| Sheila | Claim Date Filed: 08/12/2002 |
| SSN : | Benefit Year Beginning: 08/11/2002 |
| Reference Number: 783278987 | Benefit Year Ending: 08/10/2003 |
| Reason For Separation: Laid off, no more work available | Date Determination Mailed: 08/13/2002 |

\* A Protest/Appeal Is Requested For: Determination of Benefits

\* Reason for Protest/Appeal

> Use this space to enter text related to claimant's separation from employment.

Information Provided By:                    [Save Draft] [Continue]

\* Name: [          ]

\* Address: [          ]

\* City, St Zip: [Topeka] [KS▼] [66612]

\* Phone: ([785]) [555]-[5555] ext. [4444]

Copyright © 2002       All rights reserved

Employee Wage Report

☆ Employers

View Account Info   File Unemployment   Transactions   Make Payment   Policies and Procedures   Message Box August 22, 2002
3 Qtr, 2002

Choose Sort Order: [SSN ▼]     Filing Report For: [Current Quarter ▼]

Employee Information          Gross Wages Paid

| SSN | Name | 1 Qtr | 2 Qtr | 3 Qtr | 4 Qtr | Year to Date | No. of Weeks | Status |
|---|---|---|---|---|---|---|---|---|
| | Smith S R | 3,456.56 | 5,456.43 | | | 8,912.99 | [0 ▼] | Active |
| | Robert F F | 4,543.45 | 5,500.00 | | | 10,043.23 | [0 ▼] | Active |
| | Kennedy R F | 2,323.24 | 3,453.45 | | | 5,776.43 | [0 ▼] | Active |
| | O'Malley J S | 456.67 | 6,543.45 | | | 7,000.12 | [0 ▼] | Active |
| | Richard F J | 5,456.43 | 5,456.43 | | | 10,912.86 | [0 ▼] | Active |
| | Andersen S B | 2,343.23 | 5,500.00 | | | 7,843.23 | [0 ▼] | Active |
| | Williams J F | 3,453.45 | 3,453.45 | | | 6,906.90 | [0 ▼] | Active |
| | McDonald B S | 6,543.45 | 6,543.45 | | | 13,086.90 | [0 ▼] | Active |
| | Stibek S D | 5,456.40 | 1,000.40 | | | 6,456.80 | [0 ▼] | Active |
| | Burner N C | 2,343.23 | 5,500.00 | | | 7,843.23 | [0 ▼] | Active |
| | Butterfield D J | 3,453.45 | 9,453.45 | | | 12,906.90 | [0 ▼] | Active |
| | Calet J Q | 6,543.45 | 2,543.45 | | | 9,086.90 | [0 ▼] | Active |

[<< Previous] [Next >>]            [Add Employees] [Modify Employees]

Please Mark the Appropriate Box: (If Applicable)

☐ Please an X here if you had no workers or paid no wages this Quarter.
☐ Please an X here if individual employee's wages are reported on magnetic tape or diskette. (Complete Employee's Contribution Report, print, sign at both places indicated and submit the form with your tape or diskette)

Number of Covered Workers

January [        ]     Contact Person [              ]     [Calculate Total]

February [        ]    Contact Phone [   ]-[   ]-[   ]    [Save as Draft]

March [        ]       Date  August 22, 2002              [Delete Draft]

Copyright © 2002     All rights reserved

Employers

View Account Info  File Unemployment  Transactions  Make Payment  Policies and Procedures  Message Box

Balance Due

Outstanding Collection Balance as of September 7, 2002     Current Amount Due: 4,343.34

| Assesment # | Lien # | Tax | Interest Due | Forfeiture | Paid | Canceled | Total |
|---|---|---|---|---|---|---|---|
| 2 Qtr. 2001 | | | | | | | $7,088.54 |
| F2439281 | 23409471 | $6,930.83 | $0.00 | $500.00 | ($6,776.53) | ($211.09) | $443.21 |
| F2439280 | 47929023 | $6,145.33 | $0.00 | $500.00 | | | $6,645.33 |
| 2 Qtr. 2002 | | | | | | | $6,760.21 |
| F2439283 | 43459840 | $6,260.21 | $0.00 | $500.00 | | | $6,760.21 |

2001 Current Amount Due: $7,088.54
2002 Current Amount Due: $6,760.21

Interest Due As of 09/07/2002     Current Total Amount Due: $13,848.75

For Assistance, call the Collection Section at (785)466-2781 ext.5000, or send us an e-mail at

[File Electronic Payment]

Copyright © 2002     All rights reserved

☆ Employers

View Account Info  File Unemployment  Transactions  Make Payment  Policies and Procedures  Message Box Monthly Benefits Charge Statement Monthly Statement For: [August 2002 ▼]

Charges By Week:
| | | |
|---|---|---:|
| Charges Posted as of August 2, 2002: | 728,313.31 | |
| | August 10, 2002 | 64,023.90 |
| | August 17, 2002 | (10,181.67) |
| | August 24, 2002 | 43,315.16 |
| | August 31, 2002 | 121,538.95 |
| Total Charges as of August 31, 2002: | 947,009.65 | |

---

View Weekly Charges

Current Weekly Charges as of September 5, 2002:       $5,607.00

Weekly Statement for:                    Period Statement for:

[May 25, 2002 ▼]  OR From: [          ] (mm/dd/yyyy) To: [          ] (mm/dd/yyyy)

[View]                                   [View]

Copyright © 2002        All rights reserved
🏠

FIG. 13

☆ Employers

View Account Info  File Unemployment  Transactions  Make Payment  Policies and Procedures  Message Box Determination of Benefits Reference Number: 783278987                                              5768493-43-1
Claimant Information

| Sheila | Claim Date Filed: | 08/12/2002 |
| --- | --- | --- |
| SSN: | Benefit Year Beginning: | 08/11/2002 |
| | Benefit Year Ending: | 08/10/2003 |
| | Date Determination Mailed: | 08/13/2002 |

Base Period: April 1, 2001 - March 31, 2002

The Claimant Has Qualifying Base Period Wage Credits.
Weekly Benefit Amount:                                              $ 289.00
Dependency Class:                                                        A
Amount of Maximum Potential Chargeback:                    $ 5,000.00
Proportion Charge:                                                  100.000 %
Reason for Seperation:              Laid off, no more work available.

A decision allowing the application does not mean the claimant will receive benefits. The claimant and his/her most recent employer(s) will receive a separate determination of eligibility to be paid weekly benefits which may or may not be in favor of the claimant.

| Submit Protest |

Copyright © 2002        All rights reserved

FIG. 14

Claim History

Claimant Information
Sheila..............
SSN:
Benefit Year Begin Date: 08/11/2002
Benefit Year Ending Date: 08/10/2003
Claim Date: 08/11/2002

Claim Status: Initial State
Weekly Benefit Amount: $ 175.00
Maximum Benefit Amount: $ 5,000
Retirement Deduction: Yes
Child Support Deduction: No History as of 09/15/2002

An Overpayment Exists on Your Account
A Penalty Exists on Your Account

| Reference# | Week | Status | Claim Date | Earning Deducted | Date Paid | Gross Amount | Check Amount |
|---|---|---|---|---|---|---|---|
| 890890001 | Agust 11 - 17, 2002 | Waiting Week | 08/18/2002 | $ 0.00 | $10.00 | - | $0.00 | $0.00 |
| 890890001 | Agust 18 - 24, 2002 | Allowed | 08/25/2002 | $0.00 | $10.00 | 08/30/2002 | $165.00 | $165.00 |
| 890890003 | Agust 25 - 31, 2002 | Allowed | 09/01/2002 | $50.00 | $10.00 | 09/07/2002 | $115.00 | $115.00 |
| 890890004 | Agust 1 - 7, 2002 | Allowed | 09/08/2002 | $0.00 | $10.00 | 09/14/2002 | $165.00 | $165.00 |

Remaining Balance $ 4555

Copyright © 2002    All rights reserved

FIG. 15

UNEMPLOYMENT INSURANCE MANAGEMENT

CLAIM OF PRIORITY

This application claims priority under 35 U.S.C. §119(e) to U.S. Provisional Patent Application Ser. No. 60/432,845, filed on Dec. 12, 2002, the entire contents of which are hereby incorporated by reference.

TECHNICAL FIELD

This document generally relates to an unemployment insurance method and system.

BACKGROUND

Many state unemployment insurance agencies manage their unemployment insurance ("UI") programs using multiple computer systems and workforces. A first workforce uses a first computer system and database to handle requests from claimants seeking UI benefits. A second workforce uses a second computer system and database to manage UI tax collection from employers. The first and second computer systems and databases are "silo'ed," meaning that they have limited or no interfaces with each other.

These separate computer systems and workforces often create duplication of data and errors in data processing. In addition, such separate computer systems prevent a UI agency worker from having a complete picture when dealing with either a claimant seeking benefits or an employer seeking to pay taxes, which increases the chances that incomplete or inaccurate information will be provided to the claimant or employer. Moreover, having two separate workforces to handle two different computer systems results in inefficient utilization of human resources. Finally, because the benefits and tax systems are managed separately, many state agencies have difficulty detecting fraud, overpayment of UI benefits and underpayment of tax.

SUMMARY

A system for handling UI is disclosed. The system includes a unified database containing UI benefit data and UI tax data. The UI benefit data includes a benefit status of a claimant and the UI tax data includes a tax payment status of an employer associated with the claimant. The system also includes a functional layer that is configured to evaluate a request for a UI benefit by the claimant based on the benefit status of the claimant and the tax payment status of the employer. Implementations may include one or more of the following features.

For example, the unified database may include a data manager configured to manage the UI benefit data and the UI tax data. The system also may include an access channel configured to allow a user access to the unified database and to the functional layer. The access channel may include a telephone contact center configured to receive telephone calls from a user. The access channel also may include a web self-service center configured to communicate with a user over a computer network. In addition, the access channel may include an optical character recognition module configured to scan a paper document received from a user and convert information on the paper document to computer readable data.

The system further may include a unified desktop that is configured to allow a worker to manage the UI benefit data, the UI tax data, and the functional layer. The unified desktop may enable the worker to manage the request for the UI benefit by the claimant. The unified desktop also may enable the worker to manage a payment of a UI tax by the employer. The unified desktop further may include one or more pop-up screens that provide information to the worker and one or more predetermined scripts for use by the worker.

In addition, the system may include a web page interface configured to receive a web-based communication from a user or to send a web-based communication to a user. The web page interface may include one or more web pages configured to enable the claimant to submit the request for the UI benefit. The web page interface also may include one or more web pages configured to enable the employer to manage a UI tax.

Furthermore, the system may include a reporting layer that is configured to generate a report based on the UI benefit data and the UI tax data. The report may include at least one of an employer balance due report, an employer monthly benefits charge statement, an employer determination of benefits report, a claimant claim history report, a claimant job referral report, a performance metrics report, a notice, an identification of claimant discrepancy report, and an identification of agency discrepancy report.

The system also may include an external system interface configured to communicate with an external agency. The external agency may be a state agency and a federal agency.

The functional layer further may be configured to receive the request for the UI benefit, to send a notification to the employer associated with the claimant indicating that the claimant is seeking the UI benefit, and to receive a response from the employer to the notification. The functional layer also may be configured to update the unified database based on the response from the employer. In addition, the functional layer may be configured to check the benefit status of the claimant, to check the tax payment status of the employer, and to issue the UI benefit to the claimant if the claimant is eligible for the UI benefit. Further, the functional layer may be configured to receive an update of the benefit status of the claimant and to evaluate whether to terminate the UI benefit. The functional layer also may be configured to determine whether the request for the UI benefit is fraudulent based on a tax payment status of a second employer associated with the claimant.

In addition, the functional layer may be further configured to receive tax information regarding taxes owed by the employer and to update the UI tax data with the tax information. The functional layer also may be configured to receive wage information regarding wages paid by the employer and to update the UI tax data with the wage information. The functional layer may be configured to calculate an amount of UI tax owed or credit earned by the employer based upon the wage information and to notify the employer of the amount of UI tax owed or credit earned by the employer.

The functional layer further may be configured to register an employer, to notify an employer of a delinquent tax payment, to perform a wage investigation, to make an adjustment to a tax of the employer, and to generate a notice of the adjustment. In addition, the functional layer may be configured to manage an employer insolvency, process a UI benefit payment, to notify a claimant of a UI benefit overpayment, to account for a benefit payment, and to perform an audit.

In another implementation, a system for handling UI may include UI benefit data including a benefit status of a claimant, UI tax data including a tax payment status of an employer associated with the claimant, and a unified desktop that is configured to process a function related to a UI benefit for the claimant and a function related a UI tax for the employer, based on the benefit status of the claimant and the tax payment status of the employer.

In various implementations, the disclosed system may provide one or more of the following advantages. The unified database unifies data on benefits, wages, tax payments and benefits payment control into one unified database, eliminating the need for duplicate fields among separate databases and, consequently, improving the data storage and processing efficiencies. The unified desktop provides UI agency workers with complete information on both claimants and employers, increasing the efficiency of the workers and reducing the probability of error. The unified database and unified desktop increase efficiency and accuracy by providing a worker with the most current information on a claimant's claims for UI benefits and an employer's information on employees names, wages paid, taxes paid and any credits or additional amounts due. Thus, the benefits and tax components of a UI program are combined and implemented by one system, handled by workers in one department.

The disclosed system also allows claimants and employers to enter and access data by a wide variety of access channels, including the Internet, mail, facsimile, telephone, and interactive voice recognition (IVR). By integrating these channels, the disclosed system increases efficiency by allowing claimants and employers to access and update data without the assistance of a worker in the UI agency. These access channels also provide checks to ensure that data is entered in a complete and accurate manner, to reduce the number of call-backs to obtain additional information.

These general and specific aspects may be implemented using a system, a method, or a computer program, or any combination of systems, methods, and computer programs. Other features will be apparent from the description and drawings, and from the claims.

BRIEF DESCRIPTION OF DRAWINGS

FIG. 4 is a screen shot of an exemplary introductory web page.

FIGS. 5A-5H are screen shots of an exemplary UI claim form.

FIGS. 6A-6K are screen shots of an exemplary employer registration form.

FIGS. 7A and 7B are screen shots of an exemplary employer separation information request form.

FIG. 8 is a screen shot of an exemplary employer request for protest/appeal form.

FIG. 9 is a screen shot of an exemplary employee wage report form.

FIG. 10 is a screen shot of an exemplary employer tax balance due report.

FIG. 11 is a screen shot of an exemplary employer tax payment form.

FIG. 13 is a screen shot of an exemplary employer monthly tax statement.

FIG. 14 is a screen shot of an exemplary determination of benefits report.

FIG. 15 is a screen shot of an exemplary claimant's claim history report.

Like reference symbols in the various drawings indicate like elements.

DETAILED DESCRIPTION

A system and method for handling UI is disclosed. The system includes a unified database containing UI benefit data and UI tax data where the UI benefit data and the UI tax data are unified into unified data. The system may include a unified desktop that is configured to allow a worker to manage the UI benefit data and the UI tax data. The system enables a worker to manage a claim for UI benefits and an employer's UI tax.

Figure 1:
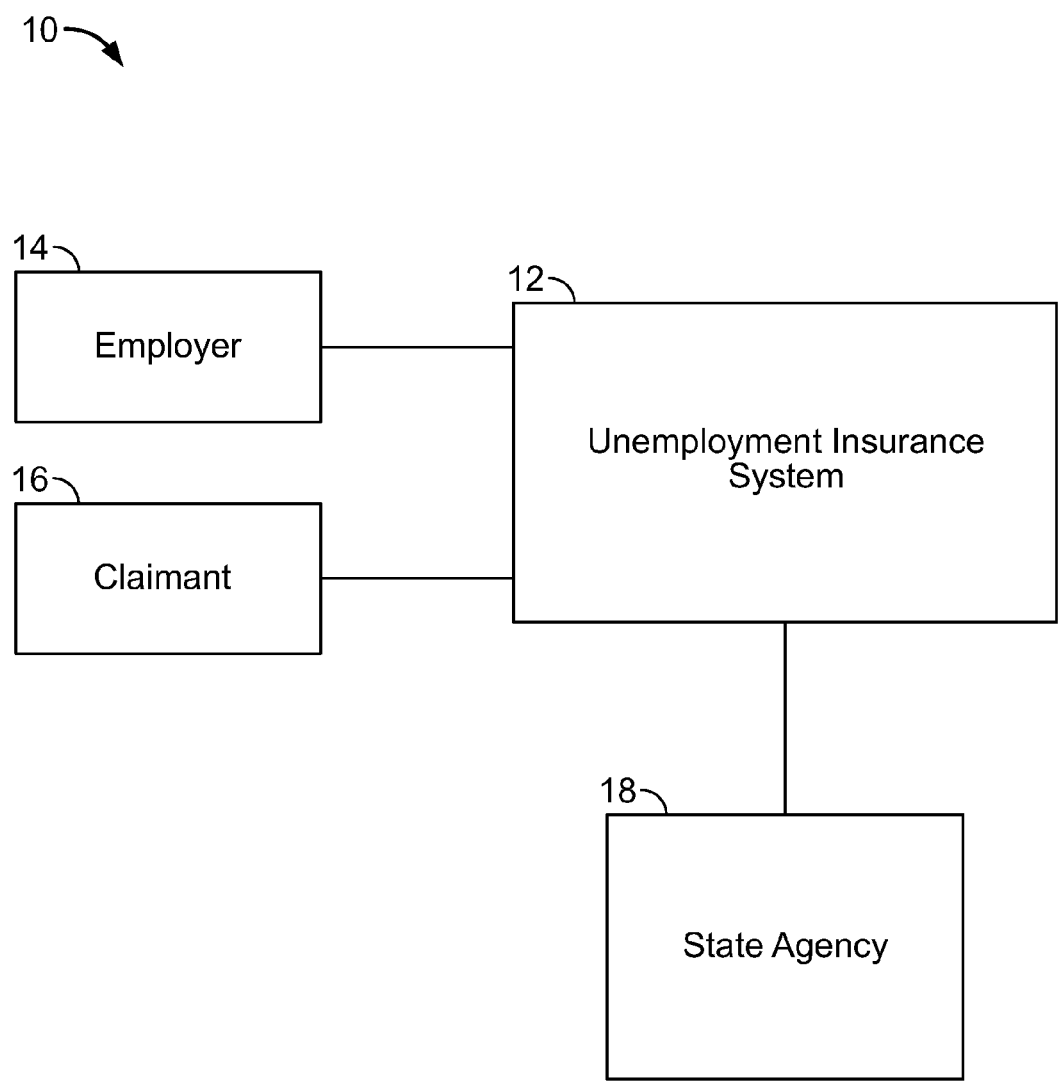
FIG. 1 is a block diagram of an implementation of a UI system.

FIG. 1 is a block diagram 10 of a UI system 12. UI system 12 is configured to provide a UI agency 18 and its workers a single system for processing a claimant's 16 request for UI benefits and for processing an employer's 14 UI requirements, such as UI tax payments. UI system 12 may be configured to handle all UI functions related to the claimant 16 and the employer 14 and to facilitate communication with and among the UI agency 18, the employer 14, and the claimant 16 over one or more communication channels.

Figure 2:
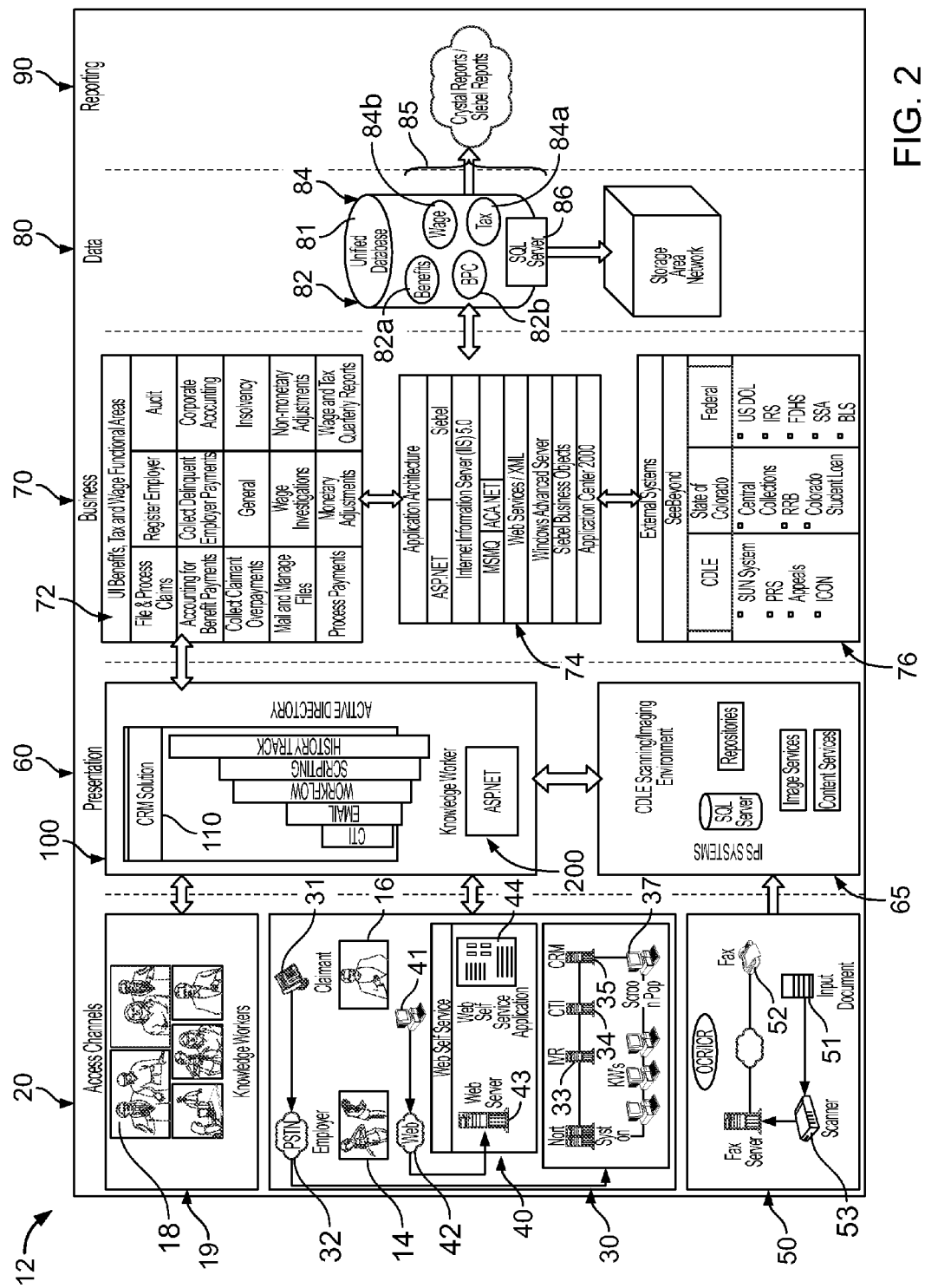
FIG. 2 is a detailed block diagram of an implementation of a UI system.

FIG. 2 is a more detailed view of UI system 12 shown in FIG. 1. UI system 12 includes access channels 20, presentation layer 60, business layer 70, data layer 80, and reporting layer 90.

UI agency 18, employer 14 and claimant 16 interact with UI system 12 through one or more access channels 20. UI agency 18 communicates through one or more of its employees, contractors or other workers, referred to herein as knowledge workers 19. Access channels 20 allow employers 14, claimants 16, and knowledge workers 19, to communicate with one another and to access the UI system 12 through one or more communication means.

In one implementation of access channels 20, employer 14 or claimant 16 can communicate with UI system 12 through a telephone contact center 30. Employer 14 or claimant 16 calls telephone contact center 30 through using a telephone 31 over a public switched telephone network (PSTN) 32. Telephone contact center 30 includes an interactive voice response (IVR) module 33 that automatically prompts the caller to provide information by depressing a touchtone keypad or speaking into telephone 31. In one exemplary implementation, this information is automatically processed to UI system 12 using a computer telephone integration (CTI) module 34 linked with a customer relationship management (CRM) solution 35. In another exemplary implementation, knowledge worker 19 listens to the call and processes the information manually on a computer terminal 36. As discussed below, this manual processing can be facilitated by screen pops 37 on computer terminal 36.

In another exemplary implementation of access channels 20, employer 14 or claimant 16 can communicate with UI system 12 though a web self-service center 40. Web self-service center 40 can be accessed over the Internet 42 by a personal computer 41 or other device having Internet access. Web self-service center 40 includes a web server 43 and a web self-service application 44 that facilitates access to UI system 12. Web self-service center 40 permits claimant 16 and employer 14 to enter, update and access their respective information from data layer 80. Web self-service center 40 allows the use of user identifications and passwords to restrict access to data, permitting employer 16 or claimant 14 access to their records outside of normal business hours. Web self-service center 40 also permits knowledge workers 18 to have remote access to UI system 12, based on the worker's authorization. In addition, web self-service center 40 may be used to allow other government agencies access to unified database 81, such as, to pull information off of UI system 12. As described in more detail below, web self center 40 interacts with UI system 12 through, for example, ASP.NET technology, to allow users to establish, enter, update and access information in a secure setting that protects the information from accidental exposure.

In yet another implementation of access channels 20, employer 14 or claimant 16 can communicate with UI system 12 through an optical character recognition/intelligent character recognition (OCR/ICR) module 50. OCR/ICR module 50 can be accessed through an input document 51 sent by fax 52 or by mail. The input 51 document is scanned using an optical character recognition scanner 53 that converts the scanned image into electronic computer readable data. OCR/ICR module 50 provides for recognition of typed and handwritten characters, including recognition of non-standard characters. As discussed below, the data is transferred to the UI system 12 by an image processing module 65 in presentation layer 60.

In other implementations of access channels 20, information can be communicated using electronic mail, facsimile, traditional mail, visits to the UI office, or other communications means.

Presentation layer 60 includes a unified desktop interface 100, a web page interface 200, and an image processing module 65. Unified desktop 100 includes a user interface that assists knowledge worker 19 in interacting with and receiving communications from claimant 16 and employer 14 through access channels 20, such as through telephone contact center 30. Unified desktop 100 is linked to business layer 70 to facilitate knowledge worker 19 initiating or performing business functions related to claimant 16 and employer 14, which are described in greater detail below. Unified desktop 100 also interfaces with data layer 80 to facilitate knowledge worker 19 retrieving and updating data in unified database 81, which is described in greater detail below. Thus, by using unified desktop 100, a single knowledge worker 19 is able to manage all functions of UI system 12 related to both claimants 16 and employers 14 that are discussed below.

In an implementation, unified desktop 100 is implemented by a customer relationship management (CRM) software package 110 with a web-browser based graphical user interface, such as a software package based on Windows® NT technology and driven by Microsoft®.NET programming packages. Unified desktop 100 also is coupled to IVR module 33 and CTI module 34 of telephone contact center 30 to provide information to unified desktop 100. When a caller calls the telephone call center 30, unified desktop 100 presents knowledge worker 19 with one or more pop-up screens that provide information automatically gathered from telephone contact center 30 and from unified database 81 related to the caller. Unified desktop 100 also presents knowledge worker 19 with one or more pop-up screens that contain predetermined scripts to assist knowledge worker 19 in addressing the needs of the caller, whether the caller is a claimant 16 or an employer 14. Unified desktop 100 includes "front-end" edits that verify data inputted by knowledge worker 19, such as social security number, address, and employment history, and prompts knowledge worker 19 to confirm any change to that information or notifies knowledge worker 19 if an entry is not valid. In addition, unified desktop 100 permits knowledge worker 19 to review all prior contacts between claimant 16, employer 14, and UI agency 18.

For example, unified desktop 100 can be used to process a claimant's 14 call to telephone call center 30 to file a claim for unemployment insurance. This process is described as part of Example 1 below. In this implementation, IVR module 33 and CTI module of 34 collect basic information, such as date of termination of employment, date of birth, and social security number. This information is matched up with data from unified database 81, including data related to claimant's employer and payment of UI taxes. All of this information may be presented to knowledge worker 19 through unified desktop 100. Next, unified desktop 100 presents knowledge worker 19 with pop-up screens containing a script to collect the necessary information to process the claimant's claim. As knowledge worker 19 collects additional information, 19 knowledge worker inputs the information into appropriate fields in the pop-up screens. Unified desktop 100 may include checks to prevent knowledge worker 19 from entering patently incorrect information or from skipping necessary information. Once knowledge worker 19 has collected all necessary information to process claimant's claim, unified desktop 100 saves the information in unified database 81 and initiates the business function to file and process the claim. Unified desktop 100 may be used to facilitate initiation of other business functions, some of which are described in greater detail below. In some instances, claimant 16 or employer 14 may contact knowledge worker 19 through telephone call center 30 but may not have enough information to provide to knowledge worker 19 in order to complete a transaction using unified desktop 100. In such instances, the incomplete information may be stored in unified database 81 pending completion of the file.

In addition, unified desktop 100 may include reminders about when claimant 16 needs to call back to provide follow-up data and answers to frequently asked questions. Unified desktop 100 may further include a scratch pad that permits knowledge worker 19 to enter temporary data for use during a call, such as a telephone number for the caller in the event the call is unintentionally disconnected. In an implementation, unified desktop 100 permits knowledge worker 19 to save information that claimant 16 or employer 14 is assuming for purpose of the call, but should not be entered into unified database 81. For example, unified desktop 100 may facilitate working through a "what if" scenario when claimant 16 asserts that some qualifying employment is not in UI system 12 and provides approximate dates of work and salary.

Unified desktop 100 efficiently addresses the caller's needs while minimizing the number of calls required to process a caller's requests. In addition, unified desktop 100 enables knowledge worker 19 to respond to calls from either employers 14 or claimants 16 in a timely and accurate manner, reducing the need to transfer a call, reducing call waiting time for callers, and improving the efficient use of knowledge workers 19 in the face of shrinking government budgets to fund the UI process.

Presentation layer 60 further includes web page interface 200 that facilitates direct communication between UI system 12 and employer 14 or claimant 16 over the Internet. The dynamic web page interface may be built, for example, from Microsoft® Active Server Page (ASP.NET) technology. Web page interface 200 permits employer 14 and claimant 16 to initiate, process, and review business processes in business layer 70, to establish, enter, update and access data in data layer 80, and to generate and receive reports from reporting layer 90. Web page interface 200 includes a series of web-based documents and forms that are dynamically generated based on input by employer 14 or claimant 16 and from execution of processes in business layer 70, retrieval of data from data layer 80, and generation of reports from reporting layer 90.

Exemplary screen shots of an implementation of web page interface 200 are shown in FIGS. 4-11. FIG. 4 depicts a screen shot of a welcome screen 210 seen when employer 14 or claimant 16 logs on to web self-service center 40 run by state UI agency 18. Welcome screen 210 includes hyperlinks 216 for claimants 16, for example, to find a job or file a claim for UI benefits. Welcome screen 210 also includes hyperlinks 214 for employers 14, for example, to register with UI agency 18, to pay UI taxes, or to protest a UI claim by a claimant.

Figure 5B:
Figure 5F:
Figure 6B:
Figure 6D:
Figure 6E:
Figure 6F:
Figure 6G:
Figure 6H:
Figure 6J:
Figure 6K:
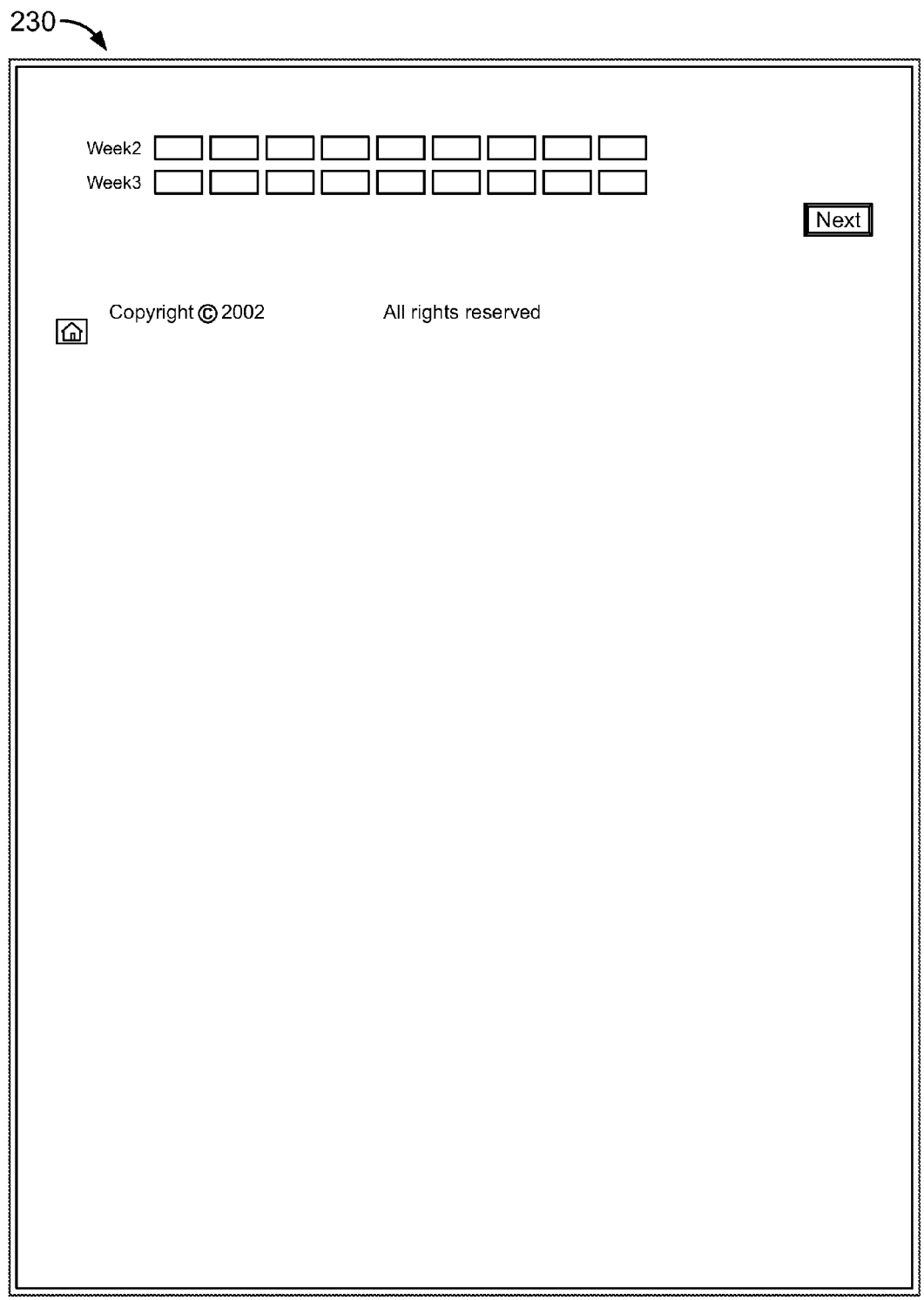

FIGS. 5A-5H depict screen shots of a form 220 that allows claimant 16 to file a claim for UI benefits. Form 220 guides claimant 16 through a series of questions and receives information from claimant 16 in order to process claim. As shown in FIG. 5E, a portion of form 220 allows claimant to search the unified database 81 for an employer for which the claimant 16 previously worked.

Figure 7B:
Figure 11:
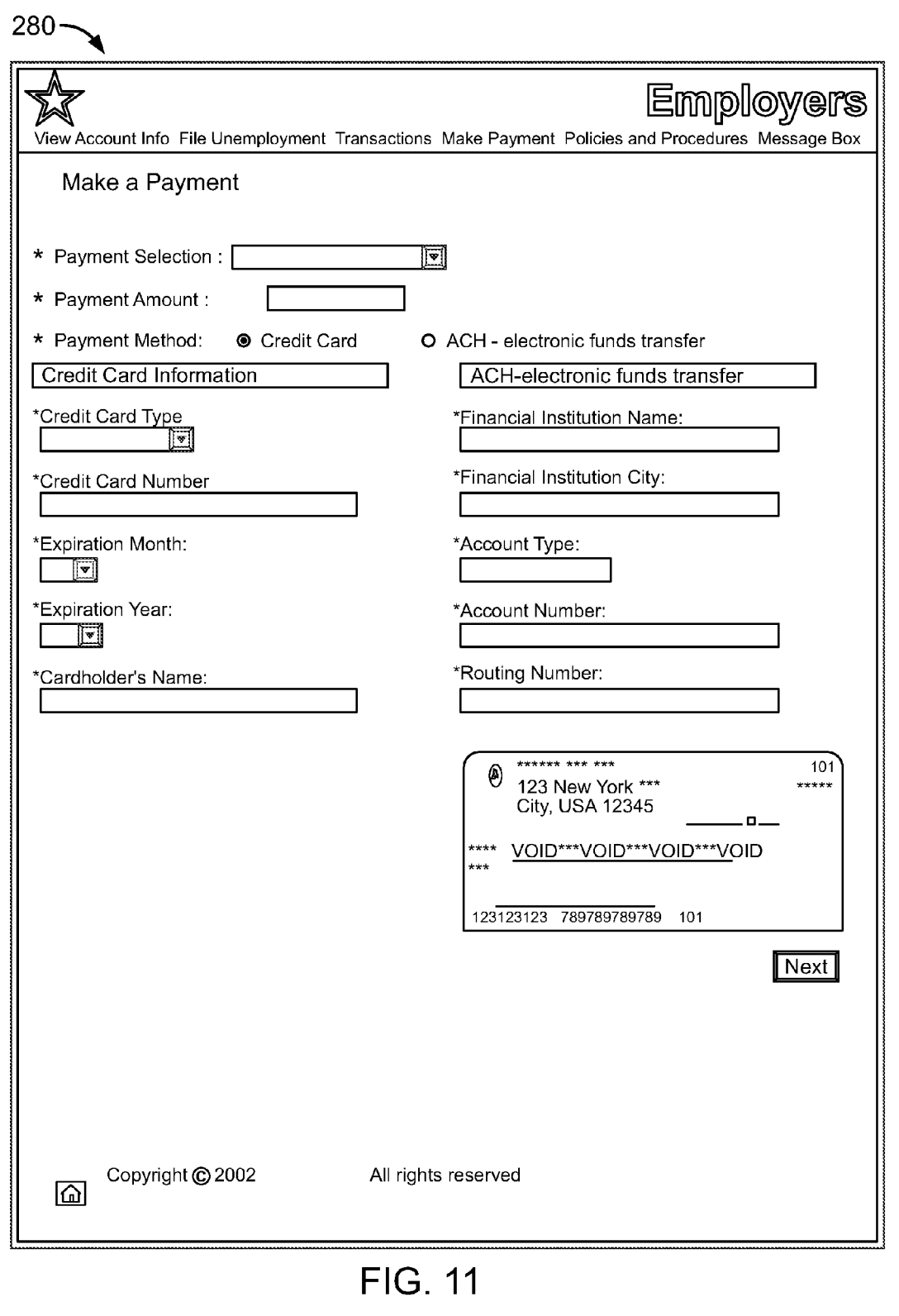

FIGS. 6A-6K depict screen shots of an employer registration form 230 that allows employer 14 to register with UI agency 18 for purposes of paying UI taxes and monitoring UI claims. FIGS. 7A-7B depict an employer questionnaire 240 for employer 14 to complete after claimant 16 files a claim against employer for unemployment benefits. FIG. 8 depicts an employer request for protest/appeal 250 for employer 14 to complete if employer 14 wishes to protest a claimant's claim for UI benefits. FIG. 9 depicts a form 260 for employer 14 to report the amount of wages paid to its employees for purposes of calculating the amount of UI tax due. FIG. 10 depicts a report 270 of the amount of UI tax due. FIG. 11 depicts a form 280 for allowing employer 14 to make an electronic payment of UI tax.

Referring back to FIG. 2, presentation layer 60 further includes image processing module 65 that interacts with OCR/ICR module 50 to handle mail, facsimiles, and other documents received by UI agency 18. As discussed above, the mail, facsimiles, and other documents may be received and scanned using an optical character recognition scanner 53 that converts the scanned image into computer readable data. Image processing module 65 processes this data through business interfaces and transmits the data for storage in data layer 80.

Business layer 70 includes UI benefits, tax and wage functional areas 72, application architecture 74 and an external systems interface 76. Application architecture 74 is programmed to implement UI benefits, tax and wage functional areas 72 to perform a wide range of business functions related to management and implementation of unemployment insurance. As shown in FIG. 2, business functions in the UI benefits, tax and wage functional areas 72 include, but are not limited to, the following: filing and processing claims for UI benefits; accounting for UI benefit payments; collecting overpayments of benefits to claimants; mailing and managing claimant files; processing claimant benefit payments; registering an employer; computing and collecting employer tax payments; collecting delinquent employer tax payments; performing wage investigations; making monetary adjustments; performing audits; performing corporate accounting; monitoring insolvency; making non-monetary adjustments; generating wage and tax reports; and general management and monitoring, including generation of regular and special reports, performance metrics on knowledge workers, and monitoring data on calls for quality management. Several of these business functions are discussed in the examples below.

Because UI laws vary from jurisdiction to jurisdiction, the business functions will vary based on the needs of the laws a particular jurisdiction.

Application architecture 74 implements UI benefits, tax and wage functional areas 72 by integrating features of one or more commercial off-the-shelf (COTS) software packages, which may be tailored to help the system operate efficiently. For example, as shown in FIG. 2, application architecture 74 is based on Microsoft® ASP.NET, Siebel® CRM, Microsoft® Internet Information Server (IIS) 5.0, Microsoft® Message Queue-Server, Avanade Connected Architectures for .NET (ACA.NET), Web Services/XML, Microsoft® Windows Advanced Server, Siebel® Business Objects, and Microsoft® Application Center 2000. It should be understood that a wide variety of other COTS may be used to build application architecture 74 in order to implement UI benefits, tax and wage functional areas 72.

External systems interface 76 allows UI system 12 to interface with existing external systems operated by UI agency 18, as well as systems operated by other state agencies, by the federal government, and by private industry. For example, interfaces with external systems may be used to process UI benefits payments, to implement collection and deposit of tax receipts as well as their proper accounting, and to assist in audits and review of tax collections and benefits payments.

Data layer 80 is responsible for managing the data needs of the system 12. Data layer includes a unified database 81 that contains UI benefit data 82, including data related to benefit claims 82a and data benefit payments control (BPC) 82b. Unified database 81 also contains UI tax data 84, including data related to tax payments 84a and data related to wage payments 84b. Benefit data 82 and tax data 84 are unified into a single set of unified data 85. Unified database 81 includes a data manager 86 configured to manage the unified data 85 in unified database 81. For example, in the implementation shown in FIG. 2, the data manager 86 is a Microsoft® Structured Query Language (SQL) server product. It will be understood unified database 81 can be built and managed with a wide variety of other COTS software and hardware data management packages.

Figure 12:
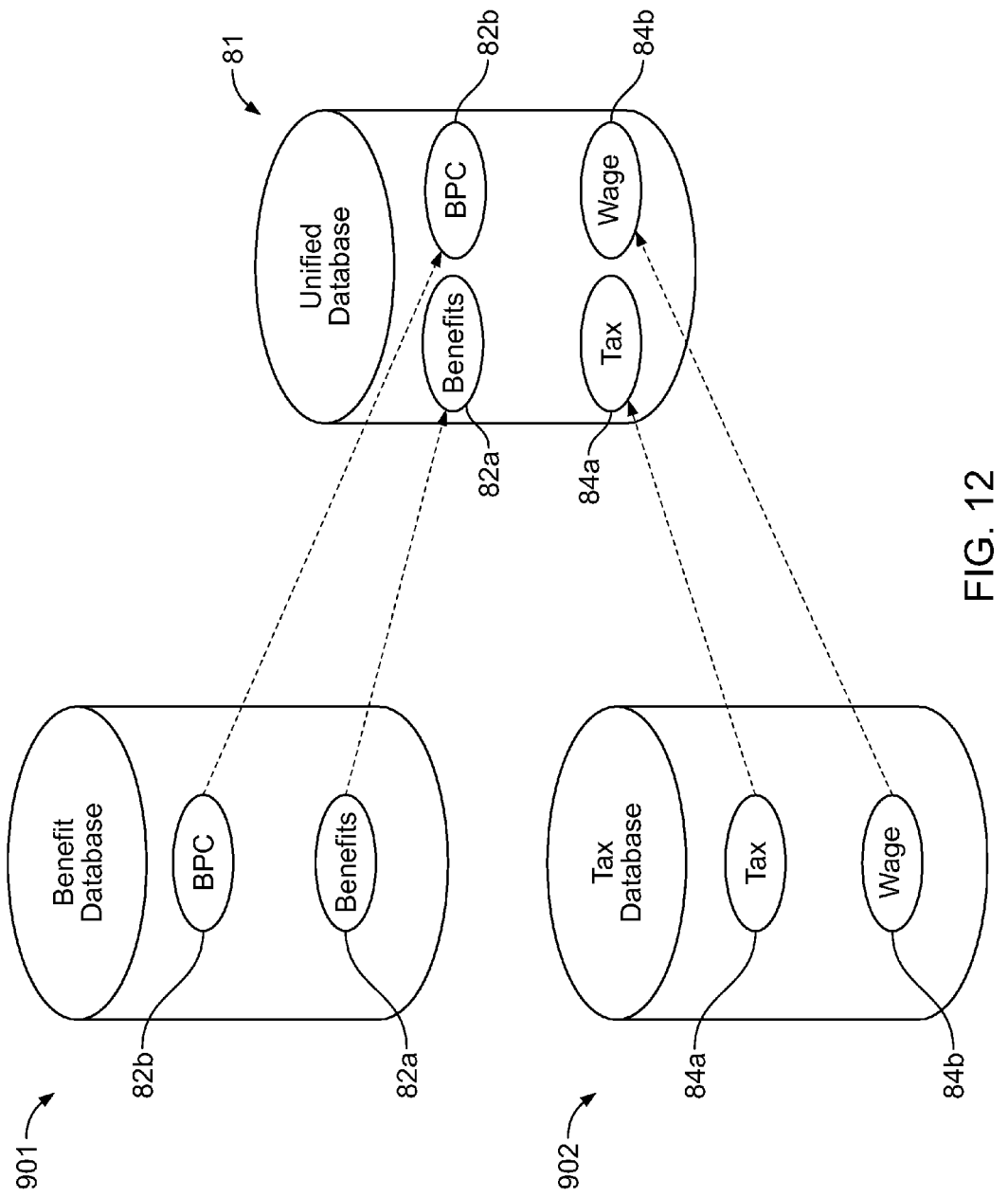
FIG. 12 is a block diagram of the mapping of the unified database.

As shown in FIG. 12, in an implementation, unified database 81 is built by mapping benefit data 82 from an existing benefit database 901 and tax data 84 from an existing tax database 902 onto unified database 81. While much of the benefit data 82 and the tax data 84 is distinct, some of the benefit data 82 and the tax data 84 overlaps. For example, employer contact information, claimant contact information, and wage payment information is part of both benefit data 82 and tax data 84. In unifying benefit data 82 and tax data 84 into unified data 85, this duplicate information may be consolidated and eliminated.

By unifying benefit data 82 and tax data 84, unified database 81 eliminates the need for maintaining shared files in two separate locations on separate databases, eliminates the need to enter data twice (once for benefits and once for tax), reduces the opportunity for errors during data entry, and reduces overall system requirements for data storage.

Referring back to FIG. 2, reporting layer 90 is configured to generate reports related to UI system 12. UI system 12 provides the UI agency with various reports on a regular and ad hoc basis. These reports can be provided in print form, by facsimile, by electronic mail, over the Internet, or by any other suitable communications means. In the implementation depicted in FIG. 2, reporting layer 90 is implemented by Crystal Reports and/or Seibel Reports. However, it will be understood that the reports can be generated by any suitable software or hardware package.

Examples of reports include: (1) Employer Balance Due; (2) Employer Monthly Benefits Charge Statement; (3) Employer Determination of Benefits; (4) Claimant Claim History; (5) Claimant Job Referral; (6) UI Agency Performance Metrics; (7) UI Agency Notices; (8) UI Agency Identification of Claimant Discrepancies; and (9) UI Agency Identification of Agency Discrepancies.

The first three of these reports are generated for employer 14. FIG. 10 depicts a screen shot of the Employer Balance Due Report that reports the outstanding balance of taxes owed by employer 14 to UI agency 18. FIG. 13 depicts a screen shot of the Employer Monthly Benefits Charge Statement that reports the benefits charged to employer 14. FIG. 14 depicts a screen shot of the Employer Determination of Benefits report that reports information to an employer about a claimant's claim for benefits.

Figure 16A:
FIGS. 16A and 16B are screen shots of an exemplary job referral report.
Figure 16B:

The next two of these reports are generated for claimant 16. FIG. 15 depicts a screen shot of the Claimant Claim History report that reports the status of weekly claims filed by a claimant, including any overpayment of benefits or penalty on the account. FIGS. 16A and 16B depict screen shots of the Claimant Job Referral report that is automatically generated when a claimant files for benefits to provide job listings for the claimant.

The final four of these reports are generated for UI agency 18 to monitor the status of UI system 12. The UI agency Performance Metrics report (not shown) reports data that permits supervisors to monitor the accuracy of the information provided by knowledge workers 19 and the number of claimants 16 and employers 14 who received assistance through UI system 12. For each call, the Performance Metrics report may classify each caller as claimant or employer, classify the complexity of the call, state whether the call was transferred to a knowledge worker, and explain whether the knowledge worker was able to resolve the issues in one call or if a follow-up call was required. The UI agency Notices reports (not shown) automatically generates a list of claimants that have failed to provide periodic reports in order to facilitate follow-up in a timely fashion. The UI agency Identification of Claimant Discrepancies report (not shown) identifies claimants who may have failed to report wages earned or failed to notify the UI agency that they have obtained new work. This report facilitates an investigation to determine if an overpayment may have been made. The UI agency Identification of Agency Discrepancies report permits UI agency 18 to identify situations wherein information provided to other governmental organizations varies with the information provided to UI agency 18. This report facilitates an investigation to determine if a tax underpayment has been made by any employer.

Figure 3:
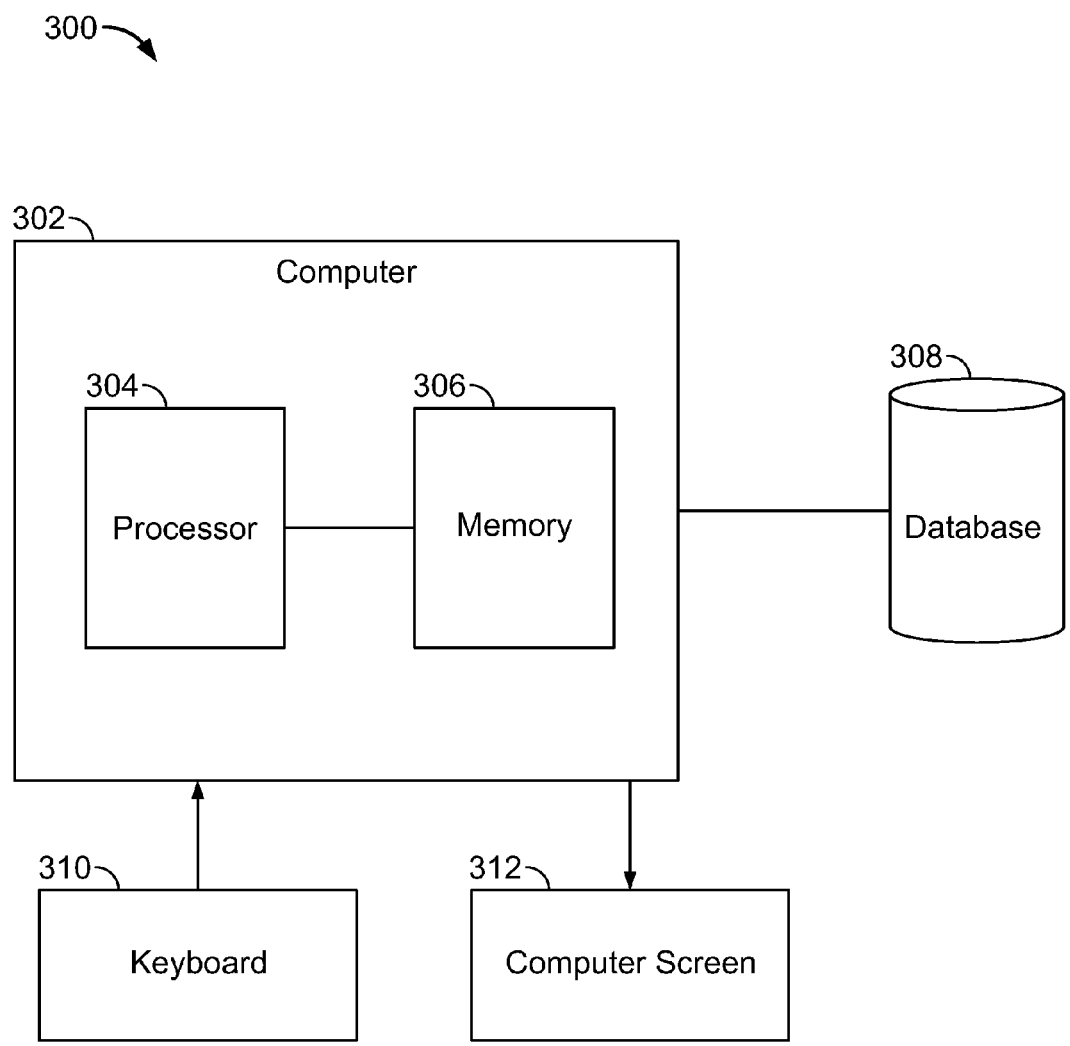
FIG. 3 is a block diagram of a computer system for implementing a UI system.

FIG. 3 is a block diagram of a computer system 300 for implementing UI system 12. A standard computer system 300 (e.g. client/server configuration, personal computer) can be used to implement the functions of UI system 12 shown in FIGS. 1 and 2. Computer system 300 may include a computer 302 having a processor 304 and memory 306 capable of executing one or more programs to perform the functions of the of UI system 12. Computer 302 also is coupled to a database 308 for managing data associated with UI system 12. Computer system 300 can include a network interface (not shown) having hardware and software components to allow users access to UI system 12 over a network such as the Internet. The network interface may allow UI system 12 to receive and transmit information related to unemployment insurance. A keyboard 310 can be used to input information to computer 302 and a computer screen 312 can be used to display information from computer 302.

The following examples describe how UI system 12 manages some of the business functions of UI set forth in block 72 of FIG. 2.

Example 1

UI Benefits Claim Process

UI system 12 is capable of handling a claimant's 16 request for UI benefits by performing the following "UI Benefits Claim Process."

1. Claimant Terminates Employment with Employer. Claimant 16 ordinarily files a claim for UI benefits after terminating employment with an employer 14, while claimant remains unemployed.

2. Claimant Submits Initial Claim for UI Benefits. Under UI system 12, claimant 16 may submit an initial claim for UI benefits through one or more access channels 20. The following are examples of claim submission through various access channels.

a. Visit UI Office. Claimant 16 physically visits a local office of the UI agency 18 and completes and submits a paper application. The paper application can then be scanned by OCR/ICR module 50, as described in subparagraph (d), below. In an alternative implementation, claimant 16 visits a local office and talks to knowledge worker 19, who enters necessary information on a form displayed on unified desktop 100. Using a series of edits, the unified desktop 100 will notify knowledge worker 19 if information is incomplete or patently inaccurate, permitting knowledge worker 19 to obtain additional or corrected information from claimant 16 at the time of submission.

b. Call Telephone Contact Center. Claimant 16 calls telephone contact center 30 to provide information to file a claim. In an implementation, claimant responds to prompts from IVR 33 to provide the necessary information to file a claim. The recorded information may be entered automatically using CTI 34. Since the information is not entered in "real time" into UI system 12, IVR 33 and CTI 34 are not always able to detect incomplete or inaccurate information. Therefore, UI system 12 will "flag" deficient claims and generate a report of claimants that have missing, incomplete or inaccurate information, in order to permit timely contact of these claimants by telephone, e-mail, or mail.

In another implementation, claimant 16 speaks directly with knowledge worker 19 to provide the required information, which knowledge worker 19 enters into unified desktop 100. As with a claim submitted in person, unified desktop 100 notifies knowledge worker 19 if information is missing, incomplete or patently inaccurate in order to permit the knowledge worker 19 to obtain the missing, incomplete or inaccurate information at the time of the initial call. This eliminates or reduces the need for call-backs to claimant 16, improving the operating efficiency of the UI system 12. Also, this speeds the processing of the claim and reduces the time until an eligible claimant can begin to receive benefits.

c. Submit Claim Through Internet. Claimant 16 visits the UI agency website run by web self-service center 40. Claimant 16 establishes a password protected user profile and submits the necessary information on a web-based form, such as the one depicted in FIGS. 5A-5H. As with the claims submitted in person or through telephone contact center 30, upfront edits on the web-based forms will check for incomplete, missing or inaccurate information and prompt the claimant for proper information before allowing submission of a claim.

d. Submit Claim Through Fax or Mail. Claimant 16 may submit the appropriate forms for filing a claim by sending the form to UI agency 18 through fax or mail, where the form will be scanned and processed by OCR/ICR module 50 into computer readable data. As with a claim submitted through IVR, claims submitted by fax or mail are not entered into UI system 12 in "real time." Accordingly, UI system 12 will flag and provide a report of those fax or mail claims that have incomplete, missing, or inaccurate information so that those claimants can be contacted in a timely fashion.

3. Claim Processed and Saved in Unified Database. The information, as submitted by claimant 12, is reviewed for accuracy and completeness, as described above, and missing information is obtained from claimant 12. The data for the claimant's claim is saved in unified database 81. Included among this data is contact information for the claimant's previous employer for the next step in the process.

4. Former Employer Notified of Claim. Under many states' laws, a claimant's 16 employment during the most recently completed four quarters is used as the basis for determining eligibility for UI benefits and the amount of UI benefits that the claimant is due under the law. Claimant 16 is not automatically entitled to UI benefits by virtue of having terminated employment with a former employer 16. For example, claimant 16 is generally ineligible for UI benefits if he or she voluntarily quit or was fired with just cause.

Therefore, after claimant 16 submits a claim, UI system 12 facilitates notifying claimant's 16 former employer 14 about the claim. Employer 14 then has an opportunity to verify the information provided by claimant 16, such claimant's 16 dates of employment, the amount of wages paid to claimant 16 and the reason claimant 16 terminated employment with employer 14. Employer 14 may contest any of the information provided by claimant 16. UI system 12 is also used to verify that employer 14 received the claim information in a timely manner. If employer 14 fails to contest the information or fails to respond within a prescribed period of time, it may be assumed that employer 14 concurs with the information submitted by claimant 16.

In an implementation, reporting layer 90 generates a report of the relevant information based on the data stored in unified database 81. The report may be communicated to employer 14 through one or more of access channels 20, as described above. For example, the report may be sent by ordinary mail, electronic mail, facsimile transmission, or through web self-service center 40. When sent through web self-service channel 40, the report may be similar to the one depicted in FIGS. 7A and 7B.

Employer 14 responds to the report through one or more of access channels 20, as described above. For example, employer 14 may communicate in person at the UI agency, by telephone (either IVR or by speaking with knowledge worker), by mail, by electronic mail, by facsimile, or over the Internet. In an alternative implementation, employer 14 may send separation information request 240, as shown in FIGS. 7A and 7B, to UI system 12 through web self-service center 40. UI system 12 will then verify that all information in employer's 14 response is complete and accurate, process employer's 14 response, and store the information in unified database 81.

5. Claim Status Updated and Claimant Notified. Business layer 70 is then implemented to determine whether claimant 16 meets the legal requirements to be found eligible for benefits, and if so, the amount and duration of those benefits, the commencement date, and the terms and conditions of receiving the benefits (e.g., must be actively seeking employment, must report all income, etc.). If employer 14 contests claimant's 16 claim, this determination may be adjusted based on employer's 14 contentions. At each step of the process, the claimant's 16 and employer's 14 files in unified database 81 are accessed and updated. In some instances, this determination may be made by execution of instructions in business layer 70. In other instances, knowledge worker 19 or another employee of UI agency 18 may assist in making a determination and manually update the records, such as through unified desktop 100.

Once a determination has been made, a report of the determination is generated by reporting layer 90 and is communicated to claimant 16 through access channels 20, such as through telephone, mail, electronic mail, facsimile, or over the Internet. Procedures may also be provided by law for claimant 16 or employer 14 to appeal an adverse decision. UI system 12 may facilitate processing requests for appeals in ways similar to processing the initial claims, as described above.

6. UI Benefits Issued. If claimant 16 is determined to be eligible for UI benefits, the amount of benefits is calculated by applying the applicable business logic to the wages data 84 stored in unified database 81. This information is then transmitted, for example, by external systems interface 76 to a state treasurer office, which prints and mails a check to claimant's 16 address stored in unified database 81. In another implementation, the benefits payment can be transferred by electronic funds transfer (EFT), based on information submitted by claimant 16 and located in unified database 81. Once a payment is issued, claimant's 16 and employer's 14 records in unified database 81 are updated accordingly.

7. Claimant Submits Required Updates. Generally, under the law, claimant 16 must submit periodic updates to remain eligible for UI benefits. Required information generally includes information to support the assertion that the claimant 16 is actively pursuing job opportunities, reporting any income earned while collecting UI benefits, and other information needed for the UI agency to determine eligibility for continued benefits or amounts. Claimant 16 may submit this information using the access channels 20 as described in section (2), above. Such information is processed by business layer 70 and claimant's 16 file in unified database 81 is updated accordingly. Such information can be verified by former or prospective employers in the same manner as described in section (4), above.

If claimant 16 fails to provide the required updates in a timely fashion, UI system 12 may generate an automatic notice to claimant 16, which can be transmitted through access channels 20. An automatic notice can also be generated for knowledge worker 19, prompting a follow-up by telephone, e-mail, or mail.

8. Claimant No Longer Eligible for Benefits. Based on the update submitted in section (7), claimant 16 may become ineligible for benefits. Depending on the basis for terminating eligibility, various actions may be taken by the UI agency 18. Some of these reasons are described below.

a. Claimant Finds Employment. If claimant 16 finds employment, claimant 16 is required to notify UI agency 18, such as through UI system 12, and UI benefits automatically will be terminated. Claimant's 16 records and the records of the former employer and the new employer are updated in unified database 81 and benefit payments are terminated.

b. Expiration of Benefits Period. Under the law, eligibility for benefits may be limited to a finite amount of time.

Depending on the status of the law, claimant 16 may become ineligible for further benefits or may become eligible for only reduced benefits. UI system 12 will automatically notify claimant 16 and knowledge worker 19 of expiration of the benefits period, through access channels 20, and will terminate or alter the benefits.

c. Failure to Actively Seek Employment. Generally, under the law, in order to continue receiving UI benefits, claimant 16 is required to submit periodically information demonstrating that he or she is actively seeking employment. Failing to comply with this requirement often will result in termination of UI benefits. UI system 12 permits UI agency 18 to efficiently and quickly monitor and follow-up on claimant reports of actively seeking employment in order to reduce the number of ineligible claimants being paid UI benefits and to help recoup overpayments of UI benefits.

d. Fraud. Generally, under the law, claimant 16 is required to inform UI agency 18 of any wages earned while collecting UI benefits. Failure to report this information may constitute fraud and may be grounds for terminating UI benefits. Some claimants attempt to commit fraud by failing to report employment with a new employer. That information is required to be reported by the new employer as part of providing information regarding payment of UI taxes (as described in Example 2, below). In the UI system 12, because the tax data is stored together with the benefits data in unified database 81, UI system 12 automatically cross checks tax data and benefit data on a continual basis to identify situations where a claimant is employed with a new employer while attempting to continue to collect UI benefits. UI system 12 then reports this information to claimant 16 and to knowledge worker 19 and terminates UI benefits. UI system 12 also may report this information to other government agencies through external systems interface 76, such as to facilitate prosecuting claimant 16 with criminal charges.

9. Review of Claim by UI agency. UI agency 18 may review UI benefit payments made to claimants 16 in order to determine if overpayments were made. As noted above, claimants 16 are required to report wages paid while collecting UI benefits and to notify UI agency 18 if they obtain new employment. UI system 12 enables UI agency 18 to review selected claims to determine when overpayments have been made. In instances where overpayments have been made, collection efforts are initiated by UI system 12. For example, as shown in FIG. 15, claimant 16 can be notified by web self-service center of overpayments. Claimant's 16 records in unified database 81 are automatically updated accordingly.

Example 2

UI Tax Process

UI system 12 handles employer UI tax payment requirements by performing the following UI Tax Process. This UI Tax Process provides a mechanism by which employers 14 provide employee wage information and submit UI tax payments. The following steps describe how UI system 12 assists in the timely collection and posting of proper payments.

1. Register Employer. Employer 14 must register with the UI agency 18 prior to reporting employees and wages and before the UI agency 18 can assess the proper tax. Registration can be performed over any of the access channels 20 described above in Example 1. For example, FIGS. 6A to 6K depict employer registration form 230 that may be used by employer to register over the Internet through web self-service center 40.

2. Employer Notifies UI agency of New Employee. Generally, employer 14 is required by law to notify UI agency 18 of new employees. This information is used to calculate the amount of UI tax owed to UI agency 18 by employer 14. This information may be reported to UI agency 18 and input into UI system 12 through one or more of access channels 20, as described above with respect to Example 1. In some instances, this information may be reported to a government agency other than UI agency 18. In those instances, the other government agency can transfer the information to UI system 12 through external systems interface 76. The information is processed by UI system 12 and stored in unified database 81.

3. Employer Reports Wages. Employer 14 periodically reports wages paid to their employees in order to calculate the amount of UI tax due. This information may be reported to UI agency 18 and input into UI system 12 through one or more of access channels 20, as described above with respect to Example 1. For example, FIG. 9 depicts a form 260 for employer 14 to report the amount of wages paid to its employees over the Internet through web self-service center 40. This information may be reported in other media such as magnetic tapes, CD-ROMs, or diskettes. This information is processed by UI system 12 and stored in unified database 81. UI system 12 also permits verification of this information with information submitted by employer 14 to other government agencies, such as the Social Security Administration and the Internal Revenue Service. Thus, UI system 12 permits UI agency 18 to identify potential situations where information is not consistent in order to facilitate follow-up or audits.

4. Employer Pays UI Taxes. Based on the wages reported, employer's 14 UI tax liability is calculated by UI system 12. In addition to wages, UI system 12 also uses information from unified database 81 regarding claimant's 16 claims for UI benefits to update employer's 14 status. The amount of UI tax due from employer 14 is impacted by UI benefits paid out to claimants 16 (former employees), credits that employer 14 may be eligible for, and past overpayments or underpayments. UI system 12 reports the amount of tax due to employer 14 through one or more of access channels 20, as described above. Employer 14, in turn, can pay the UI taxes through access channels 20. For example, FIGS. 10 and 13 show invoices sent through web self-service center 40 regarding the amount of tax due and FIG. 11 shows a web-based form allowing employer 14 to make an electronic payment of tax due.

5. Review of Amounts of UI Tax Due or Paid. Employer 14 or UI agency 18 may initiate a review of the proper amount of UI tax due or paid by employer 14. For example, UI agency 81 may initiate a review when abnormally high or low amounts appear to be due (when compared with the historical data), when a discrepancy is identified among external data sources (such as the Social Security Administration, the Internal Revenue Service, or the state tax authority), or based on a random selection for an audit. The use of unified database 81 facilitates this review by providing timely information about both taxes due by an employer and benefits paid to that employer's former employees.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A system for handling unemployment insurance comprising:
   a database containing unemployment insurance benefit data and unemployment insurance tax data, wherein the unemployment insurance benefit data comprises a benefit status of a first particular claimant and the unemployment insurance tax data comprises an unemployment insurance tax payment status of a first particular employer associated with the first particular claimant and an unemployment insurance tax payment status of a second particular employer; and
   a computer system including at least one computer processor configured to:
   receive login information from a first user, the login information including a user identifier for the first user;
   authenticate the first user based on the login information received from the first user;
   determine that the first user is a registered employer based on the login information for the first user and identify the first user as the first particular employer;
   as a consequence of the determining that the first user is a registered employer:
      prompt the first user to provide information regarding employees of the first particular employer;
      receive information from the first user regarding employees of the first particular employer in response to the prompting,
      calculate, based on the information received from the first user, an unemployment insurance tax due by the first particular employer to a federal or state government unemployment insurance agency,
      communicate to the first user an invoice requesting payment of the unemployment insurance tax due by the first particular employer,
      receive an indication that the unemployment insurance tax due by the first particular employer has been paid,
      access the unemployment insurance tax payment status of the first particular employer stored in the database,
      update the accessed unemployment insurance tax payment status of the first particular employer based on the information received from the first user and to reflect payment of the unemployment insurance tax due by the first particular employer, and,
      store the updated unemployment insurance tax payment status of the first particular employer in the database;
   receive login information from a second user, the login information received from the second user
   determine whether the second user is a claimant or a registered employer based on the login information from the second user;
   if the second user is determined to be a claimant:
      identify the second user as the first particular claimant,
      prompt the second user to submit a request for an unemployment insurance benefit,
      receive the request for the unemployment insurance benefit in response to the prompting, and
      evaluate the request for the unemployment insurance benefit based on the benefit status of the first particular claimant and the updated unemployment insurance tax payment status of the first particular employer; and
   if the second user is determined to be a registered employer:
      identify the second user as the second particular employer,
      prompt the second user to provide information regarding employees of the second particular employer,
      receive information from the second user regarding employees of the second particular employer in response to the prompting,
      calculate based on the information received from the second user, an unemployment insurance tax due by the second particular employer to the federal or state government unemployment insurance agency, and
      communicate to the second user an invoice requesting payment of the unemployment insurance tax due by the second particular employer.

2. The system of claim 1 wherein the database further comprises a data manager configured to process the unemployment insurance benefit data and the unemployment insurance tax data.

3. The system of claim 1 further comprising an access channel configured to allow the first user access to the database and to the computer system.

4. The system of claim 3 wherein the access channel comprises a telephone contact center configured to receive telephone calls from the first user.

5. The system of claim 3 wherein the access channel comprises a web self-service center configured to communicate with the first user over a computer network.

6. The system of claim 3 wherein the access channel comprises an optical character recognition module configured to scan a paper document received from the first user and convert information on the paper document to computer readable data.

7. The system of claim 1 further comprising a desktop that is configured to allow a worker to process the unemployment insurance benefit data and the unemployment insurance tax data.

8. The system of claim 7 wherein the desktop enables the worker to process the request for the unemployment insurance benefit received from the second user.

9. The system of claim 7 wherein the desktop enables the worker to process the payment of the unemployment insurance tax due by the first particular employer.

10. The system of claim 7 wherein the desktop comprises one or more pop-up screens that provide information to the worker.

11. The system of claim 7 wherein the desktop comprises one or more predetermined dialog scripts for use by the worker.

12. The system of claim 1 further comprising a web page interface configured to receive a web-based communication from the first user.

13. The system of claim 12 wherein the web page interface is configured to send a web-based communication to the first user.

14. The system of claim 12 wherein the web page interface comprises:
   one or more web pages configured to enable the second user to submit the request for the unemployment insurance benefit; and
   one or more web pages configured to enable the first user to process payment of the unemployment insurance tax due by the first particular employer.

15. The system of claim 14 wherein the one or more web pages configured to enable the first user to process payment of the unemployment insurance tax due by the first particular employer comprises: at least one web page displaying the invoice that requests payment of the unemployment insurance tax due by the first particular employer, and at least one web page configured to receive payment information from the first user for paying the invoice that requests payment of the unemployment insurance tax due by the first particular employer.

16. The system of claim 15, wherein the payment information includes credit card information for paying the invoice that requests payment of the unemployment insurance tax due by the first particular employer.

17. The system of claim 1 further comprising a reporting layer that is configured to generate a report based on the unemployment insurance benefit data and the unemployment insurance tax data.

18. The system of claim 17 wherein the report comprises at least one of an employer balance due report, an employer monthly benefits charge statement, an employer determination of benefits report, a claimant claim history report, a claimant job referral report, a performance metrics report, a notice, an identification of claimant discrepancy report, and an identification of agency discrepancy report.

19. The system of claim 1 further comprising an external system interface configured to communicate with an external agency.

20. The system of claim 19 wherein the external agency includes at least one of the state unemployment insurance agency and the federal unemployment insurance agency.

21. The system of claim 1 wherein the computer system is further configured to:
send a notification to the first particular employer associated with the first particular claimant indicating that the first particular claimant is seeking the unemployment insurance benefit; and
receive a response from the first particular employer to the notification.

22. The system of claim 21 wherein the computer system is further configured to update the database based on the response from the first particular employer.

23. The system of claim 1 wherein the computer system is further configured to issue the unemployment insurance benefit to the first particular claimant if the first particular claimant is eligible for the unemployment insurance benefit.

24. The system of claim 23 wherein the computer system is further configured to receive an update of the benefit status of the first particular claimant.

25. The system of claim 23 wherein the computer system is further configured to evaluate whether to terminate the unemployment insurance benefit based on the updated benefit status of the first particular claimant.

26. The system of claim 1 wherein the computer system being configured to evaluate the request comprises the computer system being configured to:
access the updated unemployment insurance tax payment status of the first particular employer stored in the database,
determine, based on the accessed updated unemployment insurance tax payment status of the first particular employer, whether the first particular employer associated with the first particular claimant is an employer currently employing the first particular claimant, and
if the first particular employer associated with the first particular claimant is determined to be currently employing the first particular claimant, deny the request as fraudulent.

27. The system of claim 1 wherein the computer system being configured to receive information from the first user regarding employees of the first particular employer includes the computer system being configured to receive information about new employees of the first particular employer.

28. The system of claim 1 wherein the computer system being configured to receive information from the first user regarding employees of the first particular employer includes the computer system being configured to receive wage information paid by the first particular employer to the employees.

29. A system for handling unemployment insurance comprising:
at least one computer processor;
unemployment insurance benefit data comprising a benefit status of a first particular claimant;
unemployment insurance tax data comprising an unemployment insurance tax payment status of a first particular employer associated with the first particular claimant and an unemployment insurance tax payment status of a second particular employer; and
a desktop that is configured to:
receive login information from a first user, the login information including a user identifier for the first user;
authenticate the first user based on the login information received from the first user;
determine that the first user is a registered employer based on the login information for the first user and identifying the first user as the particular employer;
as a consequence of determining that the first user is a registered employer:
prompt the first user to provide information regarding employees of the first particular employer in response to prompting,
receive information from the first user regarding employees of the first particular employer in response to prompting,
calculate, using the at least one computer processor and based on the information received from the first user, an unemployment insurance tax due by the first particular employer to a federal or state government unemployment insurance agency,
communicate to the first user an invoice requesting payment of the unemployment insurance tax due by the first particular employer,
receive an indication that the unemployment insurance tax due by the first particular employer has been paid,
access the unemployment insurance tax payment status of the first particular employer, and
update the accessed unemployment insurance tax payment status of the first particular employer based on the information received from the first user and to reflect payment of the unemployment insurance tax due by the first particular employer;
receive login information from a second user, the login information including a user identifier for the second user;
authenticate the second user based on the login information received from the second user;
determine whether the second user is a claimant or a registered employer based on the login information for the second user;
if the second user is determined to be a claimant:
identify the second user as the first particular claimant,
prompt the second user to submit a request for an unemployment insurance benefit, receive the request for the unemployment insurance benefit in response to prompting, and evaluate the request for the unemployment insurance benefit based on the benefit status of the first particular claimant and the updated unemployment insurance tax payment status of the first particular employer; and if the second user is determined to be a registered employer:

identify the second user as the second particular employer, prompt the second user to provide information regarding employees of the second particular user, receive information from the second user regarding employees of the second particular employer in response to the prompting, calculate, based on the information received from the second user, an unemployment insurance tax due by the second particular employer to the federal or state government unemployment insurance agency, and communicate to the second user an invoice requesting payment of the unemployment insurance tax due by the second particular employer.

30. The system of claim 29, wherein the desktop comprises a web-based interface configured to provide:

one or more web pages that receive the information from the first user regarding employees of the first particular employer;

one or more web pages that display the invoice requesting payment of the unemployment insurance tax due by the first particular employer;

one or more web pages that receive payment information for payment of the unemployment insurance tax due by the first particular employer; and one or more web pages with which the second usercan interact to electronically submit the request for the unemployment insurance benefit.

31. A method for handling unemployment insurance, comprising:

providing a database of an unemployment insurance management system, the database containing unemployment insurance benefit data and unemployment insurance tax data, wherein the unemployment insurance benefit data comprises a benefit status of a first particular claimant and the unemployment insurance tax data comprises an unemployment insurance tax payment status of a first particular employer associated with the first particular claimant and an unemployment insurance tax payment status of a second particular employer;

receiving login information to the unemployment insurance management system from a first user, the login information including a user identifier for the first user;

authenticating the first user based on the login information received from the first user;

determining that the first user is a registered employer based on the login information for the first user and identifying the first user as the first particular employer;

as a consequence of determining that the first user is a registered employer;

prompting the first user to provide information regarding employees of the first particular employer, receiving information from the first user regarding employees of the first particular employer in response to the prompting, electronically calculating, by at least one computer processor and based on the information received from the first user, an unemployment insurance tax due by the first particular employer to a federal or state government unemployment insurance agency, communicating to the first user an invoice requesting payment of the unemployment insurance tax due by the first particular employer, receiving an indication that the unemployment insurance tax due by the first particular employer has been paid, electronically accessing, by the at least one computer processor, the unemployment insurance tax payment status of the first particular employer stored in the database, updating the accessed unemployment insurance tax payment status of the first particular employer based on the information received from the first user and to reflect payment of the unemployment insurance tax due by the first particular employer, and electronically storing the updated unemployment insurance tax payment status of the first particular employer in the database;

receiving login information to the unemployment insurance management system from a second user, the login information including a user identifier for the second user;

authenticating the second user based on the login information received from the second user;

determining whether the second user is a claimant or a registered employer based on the login information for the second user;

if the second user is determined to be a claimant:

identifying the second user as the first particular claimant, prompting the second user to submit a request for an unemployment insurance benefit;

receiving the request for the unemployment insurance benefit from the second user in response to the prompting, and evaluating the request for the unemployment insurance benefit received from the second user based on the benefit status of the first particular claimant and the updated unemployment insurance tax payment status of the first particular employer; and if the second user is determined to be a registered employer:

identifying the second user as the second particular employer, prompting the second user to provide information regarding employees of the second particular employer, receiving information from the second user regarding employees of the second particular employer in response to the prompting, electronically calculating, by the at least one computer processor and based on the information received from the second user, an unemployment insurance tax due by the second particular employer to the federal or state government unemployment insurance agency, and communicating to the second user an invoice requesting payment of the unemployment insurance tax due by the second particular employer.

32. The method of claim 31, wherein prompting the first user to provide information regarding employees of the first particular employer includes presenting a web page to the first user for input of wage information for employees of the first particular employer.

33. The method of claim 32, wherein communicating to the first user the invoice includes communicating the invoice as a web page that displays to the first user the unemployment insurance tax due by the first particular employer.

34. The method of claim 32, wherein prompting the second user to submit a request for an unemployment insurance benefit includes presenting a web page to the second user that prompts the second user to file a claim for an unemployment insurance benefit.

35. The method of claim 34, wherein the web page presented to the second user and the web page presented to the first user are in a same web-based interface to the unemployment insurance management system.

36. The method of claim 31,
wherein receiving the login information from the second user includes receiving the user identifier for the second user and a password for the second user, and
wherein authenticating the second user includes authenticating the second user based on the password received from the second user.

* * * * *

UNITED STATES PATENT AND TRADEMARK OFFICE
CERTIFICATE OF CORRECTION

| | | |
|---|---|---|
| PATENT NO. | : 7,974,857 B1 | |
| APPLICATION NO. | : 10/733251 | |
| DATED | : July 5, 2011 | |
| INVENTOR(S) | : Thomas M. Fischer | |

It is certified that error appears in the above-identified patent and that said Letters Patent is hereby corrected as shown below:

Title page, column 2, line 5, item (56); under "OTHER PUBLICATIONS", delete "Governmento" and insert -- Government --, therefor.

In claim 30, column 19, line 36, delete "usercan" and insert -- user can --, therefor.

In claim 31, column 19, line 60, delete "employer;" and insert -- employer: --, therefor.

Signed and Sealed this

Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,974,857 B1 | Page 1 of 1 |
| APPLICATION NO. | : 10/733251 | |
| DATED | : July 5, 2011 | |
| INVENTOR(S) | : Fischer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1795 days.

Signed and Sealed this
Thirteenth Day of December, 2011

David J. Kappos
*Director of the United States Patent and Trademark Office*